United States Patent [19]

Laar et al.

[11] 4,215,719

[45] Aug. 5, 1980

[54] INTERMIXING OF FLUID IN PLURAL TANKS WHILE MAINTAINING THE FLUID LEVELS IN THE TANKS INDEPENDENT

[75] Inventors: Erwin Laar, Taufkirchen; Werner Sieber; Josef Spickenreither, both of Munich, all of Fed. Rep. of Germany

[73] Assignee: AGFA-Gevaert, A.G., Leverkusen, Fed. Rep. of Germany

[21] Appl. No.: 937,944

[22] Filed: Aug. 30, 1978

[30] Foreign Application Priority Data

Aug. 31, 1977 [DE] Fed. Rep. of Germany ....... 2739292

[51] Int. Cl.² ........................ F16K 31/22; E03B 7/07

[52] U.S. Cl. .................................. 137/563; 137/255; 137/571; 137/428; 137/433

[58] Field of Search ............... 137/255, 265, 563, 571, 137/391, 426, 428, 433, 565; 366/159, 166

[56] References Cited

U.S. PATENT DOCUMENTS 645,925 3/1900 Bishop et al. ........................ 137/428
2,691,386 10/1954 Madison ........................... 137/433 X
2,904,062 9/1959 Techler ........................... 137/433 X
3,784,169 1/1974 Bockmann et al. .................. 137/563
4,066,097 1/1978 Fritsch ................................ 137/563

*Primary Examiner*—William R. Cline
*Attorney, Agent, or Firm*—Michael J. Striker

[57] ABSTRACT

Fluid is withdrawn from plural fluid-filled tanks via respective outflow conduits leading into a common mixing conduit which includes a mixing pump, and then branches off through respective inflow conduits for return of intermixed fluid back to the individual tanks. Each inflow conduit is provided with a valve unit comprising a vessel-like housing having an inlet port and an outlet port. The flow from the inlet port to the outlet port is regulated in dependence upon the height of fluid in the respective tank. The fluid height is sensed indirectly by sensing the height or pressure of fluid in the interior of the vessel-like housing, the latter being at least partly lower than the height of fluid in the respective tank. Thus, the return of fluid into each tank is regulated to maintain a respective fluid height therein independently of the other tanks.

12 Claims, 2 Drawing Figures

INTERMIXING OF FLUID IN PLURAL TANKS WHILE MAINTAINING THE FLUID LEVELS IN THE TANKS INDEPENDENT

BACKGROUND OF THE INVENTION

The present invention relates to problems in mixing together the fluids from two tanks, particularly corresponding tanks in two neighboring photographic developing apparatuses. In the type of mixing in question, fluid is withdrawn from plural tanks through respective outflow conduits and pumped through a common mixing conduit which then branches off into plural inflow conduits leading back into the respective tanks.

In large photographic film processing laboratories, it is common that more than one film-developing or printing machine be present and operate simultaneously. When such laboratory has a plurality of simultaneously operating film-developing machines, it is ordinarily desired that the processing fluid in corresponding processing-fluid tanks of the plural machines have exactly identical characteristics, e.g., concentration, temperature, and so forth, in order that the quality and character of the film-development performed by the plural machines be maintained substantially indistinguishable.

With this object in mind, it is known to operate the plural developing machines in an interconnected or in-tandem manner. Corresponding processing-fluid tanks of the plural machines are interconnected, i.e., the developer-fluid tanks of all the machines, the fixer-fluid tanks of all the machines, the bleaching-fluid tanks of all the machines, and so forth. For example, developer fluid is withdrawn from all the developer-fluid tanks via respective outflow conduits; the withdrawn developer fluid is then passed through a common mixing conduit, so that the developer fluid from the various developer-fluid tanks will become intermixed; and the thusly intermixed developer fluid is then branched off via respective inflow conduits and fed back to the individual developer-fluid tanks.

A problem arises when the plural developing machines are of different design and/or located at different elevations, such that the upper level of the fluid in one tank of one developing machine differs from the upper level of the fluid in the corresponding tank or one or more of the other developing machines. This situation may exist, for example, when the plural developing machines are of the same basic operation, but one is of larger dimensions than the others, its tanks for that reason likewise being larger than the corresponding tanks in the other machines and therefore the upper level of fluid in such tanks being higher than in the corresponding tanks of the other developing machines. Alternatively, the plural developing machines may be of similar dimensions, but their mounting structures or housings may hold the tanks at non-identical heights in different ones of the machines. The problem in question can be most especially serious when the plural developing machines are not located at an identical floor height, e.g., because of floor-space layouts in the laboratory.

When these situations are encountered, the resulting hydrostatic pressure differences as among corresponding tanks in the plural machines may make it impossible or difficult to maintain the upper level of fluid in each of the plural corresponding tanks at the proper respective elevation, i.e., if the corresponding tanks are to be interconnected in the manner and for the purpose explained above.

SUMMARY OF THE INVENTION

It is the general object of the invention to provide an interconnected-tank system of the type described above, but of a novel design such that the upper levels of fluid in the interconnected tanks can be kept at the proper elevations, even if it should happen that the tanks are of different dimensions and/or located at different elevations requiring that these upper levels be different.

In accordance with the invention, this is achieved by providing the tanks to be interconnected with respective outflow conduits through which their fluid can be withdrawn, a mixing pump passing the thusly withdrawn fluid through a common mixing conduit, and inflow conduits branching off to transmit the thusly intermixed fluid back to the individual tanks. Each tank is provided with a respective valve unit, connected in the inflow conduit thereof or intermediate the latter and the outlet of the mixing pump, and the respective valve unit is controlled in automatic dependence upon the height of the upper level of fluid in the respective tank.

In this way, the plural tanks can be interconnected in the desired manner for mixing purposes, but the proper height of the upper level of fluid in each tank can be maintained, thereby preventing the lowermost of such tanks from being flooded with fluid by the uppermost of such tanks.

Of course, it is desirable that the object in question be achieved in the simplest possible manner and with a minimum of cost. In the preferred embodiment of the invention, in order to avoid the complication which would be introduced by for example discrete fluid-height sensing means and control lines, the valve unit associated with each tank has essentially the form of a vessel, mounted vertically shiftable for selecting the height at which the upper surface of fluid in the respective tank is to be maintained.

Each such vessel is essentially a two-port device, one port receiving intermixed fluid from the mixing pump, the other port furnishing pumped fluid into the inflow conduit of the respective tank. The height of the respective vessel is so selected that the fluid within the valve vessel provides the necessary fluid-height feedback information for the control of the valving action occurring interiorly of the valve vessel. In this way, there is no need for a discrete fluid-height sensor in the tank nor for an electrical or hydraulic control line leading from such sensor to the valve.

If the output pressure of the mixing pump is relatively constant and predetermined, then the valve mechanism internal to the aforementioned valve vessel assumes a setting dependent upon the equilibrium between the pressure resulting from the height of fluid in the tank, on the one hand, and the output pressure of the pump, on the other hand, this setting automatically having a value such as to maintain the volumetric flow rate of fluid entering the tank at a value proper for maintaining the desired height of fluid in the respective tank.

Advantageously, the outflow conduit with which each tank is provided includes a solenoid valve which opens only when the mixing pump is in operation. Then, when the mixing pump is shut off, these solenoid valves close, preventing fluid in the tanks from flowing out of the tanks through the outflow conduits, and furthermore at that point the aforementioned valves convert over into a mode of operation essentially like that of simple check valves, preventing fluid in the tanks from flowing out of the tanks through the respective inflow conduits.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
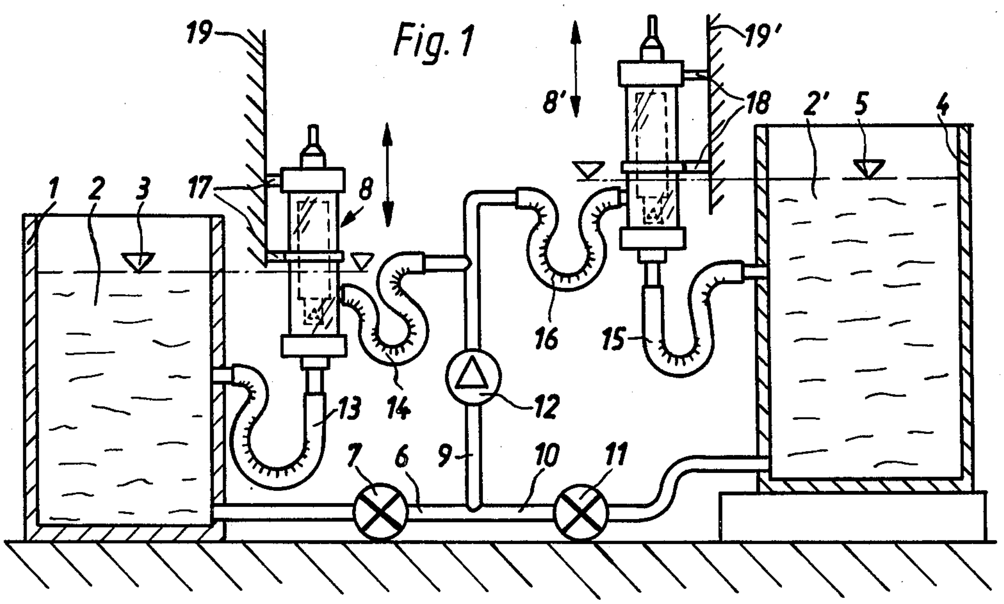
FIG. 1 schematically depicts a set-up embodying the present invention.

In FIG. 1, numeral 1 denotes a processing-fluid tank of, for example, a first photographic-film developing machine of the type comprising a succession of such tanks. This tank 1 contains fluid 2, e.g., developer or fixer fluid, the upper surface of which is to be maintained at an elevation 3. Numeral 4 denotes the corresponding processing-fluid tank of a second such machine which, as can be seen, is located at a higher elevation in the same work area. Tank 4 contains fluid 2′, of the same type as the fluid 2 in tank 1, but the upper surface of the fluid 2′ in tank 4 is to be maintained at a higher elevation 5.

Connected at the bottom of tank 1 is an outflow conduit 6, in which is provided a solenoid valve 7. Outflow conduit 6 leads into a mixing conduit 9. A similar outflow conduit 11, in which is provided a solenoid valve 11, likewise leads from the bottom of tank 4 into the mixing conduit 9. A common or mixing pump 12 is provided in the mixing conduit 9. At a higher region of the tank 1, but lower than the level 3 at which fluid therein is to be maintained, there is connected an inflow conduit 13, the other end of which is connected to the outlet port of a vessel 8, which latter serves as a control valve. The inlet port of vessel 8 is connected via a conduit 14 to the output side of the common mixing pump 12. Similarly, an inflow conduit 15 is connected to the second vessel 4, at a height lower than level 5, and the other end of inflow conduit 15 is connected to the outlet port of a second such control-valve vessel 8′. The inlet port of vessel 8′ is connected via a conduit 16 to the output side of pump 12.

The vessels 8, 8′ are secured to respective holding brackets 17, 18, which are mounted on the frames 19, 19′ of the respective developing machines for vertical shifting or adjusting movement of the vessels 8, 8′ as a whole. In order that they not interfere with vertical shifting or adjusting of the vessels 8, 8′, the conduits 13, 14, 15 and 16 are at least partly of flexible construction.

The vessel-like two-port control valve unit 8 will now be described in greater detail with respect to FIG. 2. The vessel 8 comprises a cylindrical pipe 20, closed off at the top by a cover 21 and at the bottom by a bottom part 22. The cover 21 and bottom part 22 are provided with recesses 21*a*, 22*a* shaped to secure and accommodate the upper and lower ends of cylindrical pipe 20. Inserted into the upper end of cover 21 is a small pipe section 23, serving for venting purposes. The bottom part 22 of the vessel 8 is provided with an outlet port 24, to which the inflow conduit 13 is connected.

At its lower region, the vessel 8 is provided at its side with an inlet port 25, to which the conduit 14 is connected. The pipe connector constituting this inlet port 25 extends horizontally from the exterior of cylindrical pipe 20 leftwards into the interior of the pipe 20, terminating substantially in the middle of the interior of pipe 20, ending in a curved downwardly open part 26 of generally inverted-U cross-sectional configuration. Inserted into the bottom of downwardly open part 26 is an annular valve seat member 27. Valve seat member 27 has a central opening 28, cooperating with a vertically displaceable valve member 29 of generally conical configuration made of rubber. End part 26, because it constitutes the end of inlet port 25, will be understood to be stationary.

The rubber, conical valve member 29 is mounted for vertical opening and closing movement on a bracket 30, the latter being generally of U-shape and being made for example from bent rod or wire stock. The left and right legs of the U-shaped bracket 30 extend upwards, to either side of the end part 26 of the inlet port 25. The upper ends of the two vertical legs of the U-shaped bracket 30 are each bent over and secured, by means of a respective screw, to the bottom of a plate 33, the latter in turn being secured to the bottom end face of a generally cylindrical float member 32. Accordingly, the float member 32, the carrier plate 33, the U-shaped bracket 30, and the conical valve body 29 carried on the bracket 30, together constitute a single vertically shiftable structure. If this structure rises, conical valve body 29 seats against valve seat member 27 and closes valve opening 28. If this structure descends, conical valve body 29 moves down from valve seat 27, unblocking valve opening 28. Valve body 29 also assumes settings intermediate the fully blocked and fully unblocked settings, as described further below. The cylindrical float member 32 occupies approximately 90% of the part of the internal volume of cylindrical pipe 20 located above the plate 33, i.e., within the range of movement of float member 32. I.e., only a very small annular clearance is provided intermediate the outer periphery of float member 32 and the inner periphery of cylindrical pipe 20, and when the float member 32 rises to a height such as to pull bracket 30 and therefore valve member 29 up into the fully blocking setting, the clearance between the top of float member 32 and the cover 21 is likewise quite small. The float member 32 is made of high-buoyancy material, preferably PVC hardened foam material. Of course, other buoyant materials, capable of resisting the chemical aggressiveness of the particular processing fluid involved, may also be employed.

The second vessel-like control valve unit 8′ is of the same construction as valve unit 8, and therefore need not be separately described.

Figure 2:
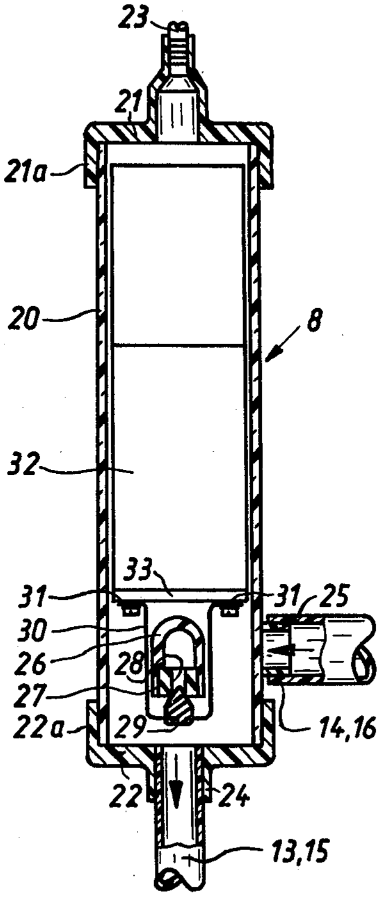
FIG. 2 is a larger-scale section through one of the valve vessels utilized in FIG. 1.

The operation of the system depicted in FIGS. 1 and 2 is as follows:

When no intermixing of the fluid 2, 2′ of the two tanks 1, 4 is to be performed, the common mixing pump 12 is shut off, and the solenoid valves 7, 11 are both closed. It is to be assumed that the fluid 2, 2′ in the tanks 1, 4 are at the proper heights 3, 5. The level of fluid in the cylindrical pipe 20 of unit 8 is the same as the level 3 of fluid 2 in tank 1. Accordingly, buoyant force urges the float member 32 upwardly, and this upwards force is transmitted via U-shaped bracket 30 to valve member 29, causing the latter to press tightly upwards against the valve seat member 27, fully blocking the valve opening 28. In this mode of operation, the vessel-like valve unit 8 acts substantially as a simple check valve, preventing the fluid 2 in tank 1 from flowing out through conduit 14. As already explained, the vessel-like unit 8 is held by holding brackets 17 on the machine frame 19 for vertical shifting or adjustment. If, in the check-valve mode of operation, the whole unit 8 is shifted downwards, it will be understood that the float member 32, in the process of trying to rise up to the level 3 of fluid 2 in tank 1, would exert via U-shaped bracket 30 a greater upwards pull on conical valve member 29, causing the valve member 29 to press even more forcefully upwards against the valve seat 27. Likewise, if the whole valve unit 8 is shifted upwards, the pressing force which conical valve member 29 exerts upwards against valve seat member 27 would decrease. Such vertical shifting or adjusting of the height of the vessel-like unit 8 is mentioned in connection with the check-valve mode of operation, but has its significance during the flow-regulating mode of operation.

When the fluid 2, 2' in the two tanks 1, 4 is to be continually intermixed, to maintain the physical and chemical characteristics of the fluid in the corresponding tanks 1, 4 of the two developing machines indistinguishable, the mixing pump 12 is switched on, and the solenoid valves 7, 11 are opened. As a result, fluid 2 is withdrawn from tank 1 through outflow conduit 6 and pumped through mixing conduit 9, and fluid 2' is withdrawn from tank 4 via outflow conduit 10. The fluid from the two tanks is mixed in mixing conduit 9, and then split off through the two conduits 14, 16, transmitted through the vessel-like control valve units 8, 8' and the respective inflow conduits 13, 15 and returned to the tanks 1, 4.

During this mode of operation, the upwards buoyant force exerted upon the float member 32, and serving to pull the conical valve member 29 upwards towards blocking position is substantially the same as described above with respect to the check-valve mode of operation, i.e., is dependent upon the height of the upper surface of the body of fluid 2 in tank 1. At the same time, pump 12 is forcing mixed fluid through conduit 14 into the inlet port 25 of the vessel-like control valve unit 8. The pressure of the thusly forced fluid is transmitted to the interior of the end part 26 of the inlet port 25, and is exerted downwardly upon the conical valve member 29, attempting to push valve member 29 and thereby pull U-shaped bracket 30 and float member 32 downwards, in opposition to the upwards buoyant force. When valve member 29 is in the fully blocked setting, i.e., when mixing pump 12 is first turned on and valves 7, 11 opened, the pressure in the end part 26 of the inlet port 25 is of course the greatest, and begins to push valve member 29 downwards. As valve member 29 begins to open in this way, the pressure in the end part 26 of the inlet port 25 is somewhat relieved and decreases. Accordingly, the valve member 29 is pushed downwards to a setting such that the downwards force attributable to the pressure in end part 26 is in equilibrium with the upwards buoyant force applied to float member 32 as determined by the height 3 of fluid 2 in tank 1. This constitutes the steady-state setting of the valve member 29. If, for any reason, the rate at which fluid is entering tank 1 via inflow conduit 13 begins to exceed the rate at which fluid is being withdrawn from tank 1 via outflow conduit 6, then the height of the upper surface of fluid 2 in tank 1 will begin to rise above the steady-state height 3. As a result, the upwards buoyant force exerted on float member 32 will increase, increasing the force with which valve member 29 is being pulled upwards, thereby causing the valve member 29 to decrease the amount of the unblocked cross-section of valve opening 28, so as to automatically reduce the rate at which fluid from mixing pump 12 can enter inflow conduit 13. This automatically restores the steady-state height 3 for the upper level of fluid 2 in tank 1.

Likewise, if for any reason the rate at which fluid is entering tank 1 via inflow conduit 13 begins to drop below the rate at which fluid is being withdrawn from tank 1 via outflow conduit 6, then the height of the upper surface of fluid 2 in tank 1 will begin to drop below the steady-state height 3. As a result, less upwards buoyant force will be exerted upon float member 32, and the downwards pressure in end part 26 of inlet port 25 will cause the valve member 29 to descend somewhat, thereby enlarging the flow cross-section of the valve opening 28, so as to automatically restore the steady-state fluid height 3.

The steady-state fluid height 3 can be selected by vertically shifting the vessel-like control valve unit 8. If the valve unit 8 is shifted upwards, a higher steady-state fluid height 3 is selected, and if shifted downwards, a lower steady-state fluid height 3 is selected.

An assumption underlying the self-regulating action described above is that the steady-state output pressure of the mixing pump 12 be fairly constant, but this is an assumption which is readily implemented.

In addition to the fact of self-regulation of the height of fluid in each tank, it is to be emphasized that despite the recirculation through a common mixing pump 12 the differing heights of fluids in the plural tanks have little or no affect upon one another. Thus, considering tank 1 and its control valve unit 8, the force tending to close valve 27, 28, 29 is determined substantially exclusively by the height of the upper surface of fluid 2 in tank 1, and this force has the character of an upwards buoyant force exerted on float member 32. In contrast, the force tending to open valve 27, 28, 29 is not a buoyant or level-dependent force, but instead is determined by the pressure prevailing within the end part 26 of the inlet port 25. Thus, although the height of fluid in the conduit 16 of the other tank may be higher than steady-state level 3, the mere fact of this higher elevation has no effect upon the buoyant force exerted upwards against float member 23. Accordingly, any hydrostatic force attributable to fluid in the conduit 16 of the other tank 4, or to the higher-elevation fluid 2' in such other tank 4, being small compared to the pump output pressure per se, creates no problems upon shut-off. I.e., if to terminate the mixing action the pump 12 is shut off and the valves 7, 11 are closed, the disappearance of pump output pressure permits the upwards buoyant force exerted against float member 32 to very reliably and positively close the valve 27, 28, 29. The higher level of fluid in conduit 16 and in other valve unit 8' is, at most, reflected in a small pressure urging valve member 29 downwards but insufficient to overcome the upwards buoyant force; the higher level of fluid in conduit 16 and in valve unit 8' is not converted into a buoyant force exerted upon the float member 32 of valve unit 8. Accordingly, during both the check-valve and flow-regulating modes of operation, the steady-state fluid heights 3, 5 can be reliably maintained independently of each other.

Typically, the desired steady-state heights 3, 5 for the fluid in the two tanks 1, 4 are not changed or reselected, and the valve units 8, 8' are vertically adjusted only at times when the output pressure of mixing pump 12 is altered, e.g., boosted in order to be able to connect a further such tank into the mixing system.

The two solenoid valves 7, 11 preferably open automatically when the mixing pump 12 is switched on, and close automatically when pump 12 is switched off. This can be implemented by connecting the solenoids of these valves in the current-supply line for pump 12, so that when the latter is energized the valves 7, 11 are necessarily energized likewise, or else by using for example pressure-responsive switches sensing the presence or absence of pump output pressure and opening valves 7, 11 in dependence thereon.

It will be appreciated that the preferred embodiment of the control valve means, shown in FIG. 2, constitutes an extremely simple structure performing relatively complicated functions, namely automatic flow and fluid-level regulation when operating in the mixing mode, check valve action when not operating in the mixing mode, automatic changeover back and forth between flow and fluid-level regulation and check valve action, and in addition serves to keep the levels of fluids in the plural interconnected tanks independent of one another. All this is accomplished using, essentially, a two-port valve structure. All the information needed for these control actions, i.e., information concerning fluid height and pump pressure, and the presence and absence of pump pressure, is transmitted via the two ports anyway needed for inflow and outflow of fluid through the valve unit 8, no other ports, e.g., no control-information ports of the like, being required.

Accordingly, the illustrated preferred embodiment is indeed preferable to comparable or functionally equivalent control devices such as would require discrete fluid-level sensors generating electrical fluid-level signals which then would have to be transmitted to control solenoids of magnetic valves, and so forth.

Also, in the illustrated embodiment, it is advantageous that the internal valves 27, 28, 29 per se are located beneath fluid 2 or 2' at all times, i.e., even when mixing pump 12 is switched off. This prevents residual fluid from crystallizing out on the surfaces of the valve seats 27 and valve members 29, and prevents foaming or oxidative degeneration of processing fluid, particularly for example if developer is involved.

It will be understood that each of the elements described above, or two or more together, may also find a useful application in other types of constructions, differing from the types described above.

While the invention has been illustrated and described as embodied in the context of plural interconnected photographic film developing machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In combination with a plurality of fluid-filled tanks, especially corresponding tanks of plural photographic film developing machines, an arrangement for intermixing the fluid in the plurality of tanks while maintaining the heights of the fluid in the plurality of tanks independent of each other, the arrangement comprising, in combination, a plurality of outflow conduits each connected to a respective tank for withdrawal of fluid therefrom; a common mixing conduit receiving fluid from the plurality of outflow conduits and including a mixing pump; a plurality of inflow conduits each connected to a respective tank for returning intermixed fluid thereto; and a plurality of control valve units, each control valve unit having an inlet port connected to the mixing conduit for receiving intermixed fluid therefrom and having an outlet port connected to a respective inflow conduit for transmitting intermixed fluid thereinto, each control valve unit furthermore comprising means operative for controlling the flow of fluid from the respective inlet port to the respective outlet port in dependence upon the height of fluid in the respective tank.

2. The arrangement defined in claim 1, each control valve unit comprising a vessel-like housing provided with said inlet and outlet port, and a valve seat and a valve member both internal to the vessel-like housing, said means being located interiorly of the vessel-like housing and being operative for sensing the height of fluid in the respective tank indirectly by sensing the condition of the fluid in the interior of the vessel-like housing and in dependence thereon controlling the relative positions of the valve seat and valve member.

3. The arrangement defined in claim 2, at least part of the vessel-like housing being located lower than the height of fluid in the respective tank, whereby via the inflow conduit the height of fluid in the interior of the vessel-like housing substantially equals the height of fluid in the respective tank, said means being operative for sensing the height of fluid in the respective tank indirectly by sensing the height of fluid in the interior of the vessel-like housing.

4. The arrangement defined in claim 3, said means comprising a float member buoyantly supported by and assuming a height dependent upon the fluid in the interior of the vessel-like housing, the float member being coupled to the valve member and controlling the setting of the valve member.

5. The arrangement defined in claim 4, the valve seat being annular and the valve member being conical with a cone angle between 50° and 70° and being made of elastic material.

6. The arrangement defined in claim 5, said means including a mounting bracket securing the conical valve member to the underside of the float member.

7. The arrangement defined in claim 4, the float member being made of high-buoyancy material.

8. The arrangement defined in claim 7, the float member being made of PVC hardened foam.

9. The arrangement defined in claim 2, the arrangement furthermore including means mounting the vessel-like housing for vertical shifting movement, whereby vertical shifting of the vessel-like housing relative to the height of the fluid in the respective tank changes the condition of the fluid in the interior of the vessel-like housing and thereby the steady-state relative positions of the valve seat and valve member.

10. The arrangement defined in claim 3, the arrangement furthermore including means mounting the vessel-like housing for vertical shifting movement, whereby vertical shifting of the vessel-like housing relative to the height of the fluid in the respective tank changes the level of the fluid in the interior of the vessel-like housing and thereby the steady-state relative positions of the valve seat and valve member.

11. The arrangement defined in claim 2, the valve member being mounted in the vessel-like housing exposed to the pressure of fluid entering the inlet port of the vessel-like housing and urged by such pressure in a first direction, said means being operative for urging the valve member in a second direction opposite to the first with a force dependent upon the condition of fluid in the interior of the vessel, whereby the steady-state setting of the valve member is determined by the equilibrium between the indirectly sensed height of fluid in the respective tank and the pressure of fluid entering the inlet port of the vessel-like housing.

12. The arrangement defined in claim 2, the arrangement furthermore including a plurality of solenoid valves each provided in a respective one of the outflow conduits and means automatically opening the solenoid valves when the mixing pump is switched on and closing them when the mixing pump is switched off.

* * * * *